United States Patent
Shental

(10) Patent No.: US 12,206,474 B2
(45) Date of Patent: Jan. 21, 2025

(54) DEEP LEARNING EIGEN-BEAMFORMING

(71) Applicant: Nokia Solutions and Networks Oy, Espoo (FI)

(72) Inventor: Ori Shental, Holmdel, NJ (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 871 days.

(21) Appl. No.: 17/284,526

(22) PCT Filed: Oct. 11, 2018

(86) PCT No.: PCT/US2018/055398
§ 371 (c)(1),
(2) Date: Apr. 12, 2021

(87) PCT Pub. No.: WO2020/076324
PCT Pub. Date: Apr. 16, 2020

(65) Prior Publication Data
US 2021/0384953 A1   Dec. 9, 2021

(51) Int. Cl.
H04B 7/06 (2006.01)
G06N 3/044 (2023.01)
H04B 7/0426 (2017.01)
H04B 7/08 (2006.01)

(52) U.S. Cl.
CPC ......... H04B 7/0617 (2013.01); H04B 7/0434 (2013.01); H04B 7/0842 (2013.01); G06N 3/044 (2023.01)

(58) Field of Classification Search
CPC .. H04B 7/0617; H04B 7/0434; H04B 7/0842; G06N 3/044
See application file for complete search history.

(56) References Cited

U.S. PATENT DOCUMENTS

| | | | |
|---|---|---|---|
| 2009/0121935 A1 | 5/2009 | Xia et al. | 342/377 |
| 2018/0260703 A1* | 9/2018 | Soljacic | G06N 3/084 |
| 2020/0169311 A1* | 5/2020 | Ottersten | H04B 7/0695 |

FOREIGN PATENT DOCUMENTS

| | | |
|---|---|---|
| CN | 104779988 A | 7/2015 |
| CN | 107766643 A | 3/2018 |

OTHER PUBLICATIONS

Cheng, Xiantao, et al., "Power Iteration Based Training for Millimeter Wave MIMO Beamforming Systems", © 2016 IEEE, 6 pgs.
Jaeger, Herbert, "A tutorial on training recurrent neural networks, covering BPPT, RTRL, EKF and the "echo state network" approach", second revision, Mar. 1, 2005, 46 pgs.

* cited by examiner

*Primary Examiner* — Sung S Ahn
(74) *Attorney, Agent, or Firm* — McCarter & English LLP

(57) ABSTRACT

According to one example embodiment, a method is provided including initializing a first recurrent neural network with a first vector; iteratively training a weight matrix for one or more layers of the first recurrent neural network, wherein W(t) is the weight matrix of the layer of the first recurrent neural network corresponding to iteration t, and wherein W(t) is based at least on a channel covariance matrix; the first vector; and an output from a previous layer of the first recurrent neural network corresponding to iteration, t-1: and determining a first eigenvector based on a converged output from the first recurrent neural network, wherein the first eigenvector is used to perform beamforming for multiple input multiple output reception and/or transmission.

20 Claims, 12 Drawing Sheets

1202: initializing a first recurrent neural network with a first vector

1204: iteratively training a weight matrix for one or more layers of the first recurrent neural network, wherein W(t) is the weight matrix of the layer of the first recurrent neural network corresponding to iteration, t, and wherein W(t) is based at least on a channel covariance matrix; the first vector; and an output from a previous layer of the first recurrent neural network corresponding to iteration, t-1

1206: determining a first eigenvector based on a converged output from the first recurrent neural network, wherein the first eigenvector is used to perform beamforming for multiple input multiple output reception and/or transmission

DEEP LEARNING EIGEN-BEAMFORMING

CROSS REFERENCE TO RELATED APPLICATION

This patent application is a U.S. National Stage application of International Patent Application Number PCT/US2018/055398 filed Oct. 11, 2018, which is hereby incorporated by reference in its entirety.

TECHNICAL FIELD

Various embodiments relate generally to wireless networks and, more specifically, relate to beamforming in wireless networks.

BACKGROUND

Beamforming, at either a transmitter (commonly referred to as precoding) or a receiver (commonly referred to as combining), is an efficient technique for combating the detrimental effect of a channel and rejecting interference. Optimal transmit and receive beamforming is known as eigen-beamforming, and is determined by the eigenvalue decomposition (EVD) of the channel covariance matrix.

Abbreviations that may be found in the specification and/or the drawing figures are defined below, at the beginning of the detailed description section.

BRIEF SUMMARY

This section is intended to include examples and is not intended to be limiting.

According to an example of an embodiment, a method is provided including initializing a first recurrent neural network with a first vector; iteratively training a weight matrix for one or more layers of the first recurrent neural network, wherein $W^{(t)}$ is the weight matrix of the layer of the first recurrent neural network corresponding to iteration, t, and wherein $W^{(t)}$ is based at least on a channel covariance matrix; the first vector; and an output from a previous layer of the first recurrent neural network corresponding to iteration, t−1; and determining a first eigenvector based on a converged output from the first recurrent neural network, wherein the first eigenvector is used to perform beamforming for multiple input multiple output reception and/or transmission.

According to another example of an embodiment, a computer readable medium comprising program instructions for causing an apparatus to perform at least the following: initializing a first recurrent neural network with a first vector; iteratively training a weight matrix for one or more layers of the first recurrent neural network, wherein $W^{(t)}$ is the weight matrix of the layer of the first recurrent neural network corresponding to iteration, t, and wherein $W^{(t)}$ is based at least on a channel covariance matrix; the first vector; and an output from a previous layer of the first recurrent neural network corresponding to iteration, t−1; and determining a first eigenvector based on a converged output from the first recurrent neural network, wherein the first eigenvector is used to perform beamforming for multiple input multiple output reception and/or transmission.

According to another example of an embodiment, an apparatus is provided including means for initializing a first recurrent neural network with a first vector; means for iteratively training a weight matrix for one or more layers of the first recurrent neural network, wherein $W^{(t)}$ is the weight matrix of the layer of the first recurrent neural network corresponding to iteration, t, and wherein $W^{(t)}$ is based at least on a channel covariance matrix; the first vector; and an output from a previous layer of the first recurrent neural network corresponding to iteration, t−1; and means for determining a first eigenvector based on a converged output from the first recurrent neural network, wherein the first eigenvector is used to perform beamforming for multiple input multiple output reception and/or transmission.

According to another example of an embodiment an apparatus is provided including at least one processor; and at least one memory including computer program code, the at least one non-transitory memory and the computer program code configured to, with the at least one processor, cause the apparatus to perform at least the following: initializing a first recurrent neural network with a first vector; iteratively training a weight matrix for one or more layers of the first recurrent neural network, wherein $W^{(t)}$ is the weight matrix of the layer of the first recurrent neural network corresponding to iteration, t, and wherein $W^{(t)}$ is based at least on a channel covariance matrix; the first vector; and an output from a previous layer of the first recurrent neural network corresponding to iteration, t−1; and determining a first eigenvector based on a converged output from the first recurrent neural network, wherein the first eigenvector is used to perform beamforming for multiple input multiple output reception and/or transmission.

DETAILED DESCRIPTION OF THE DRAWINGS

Figure 1:
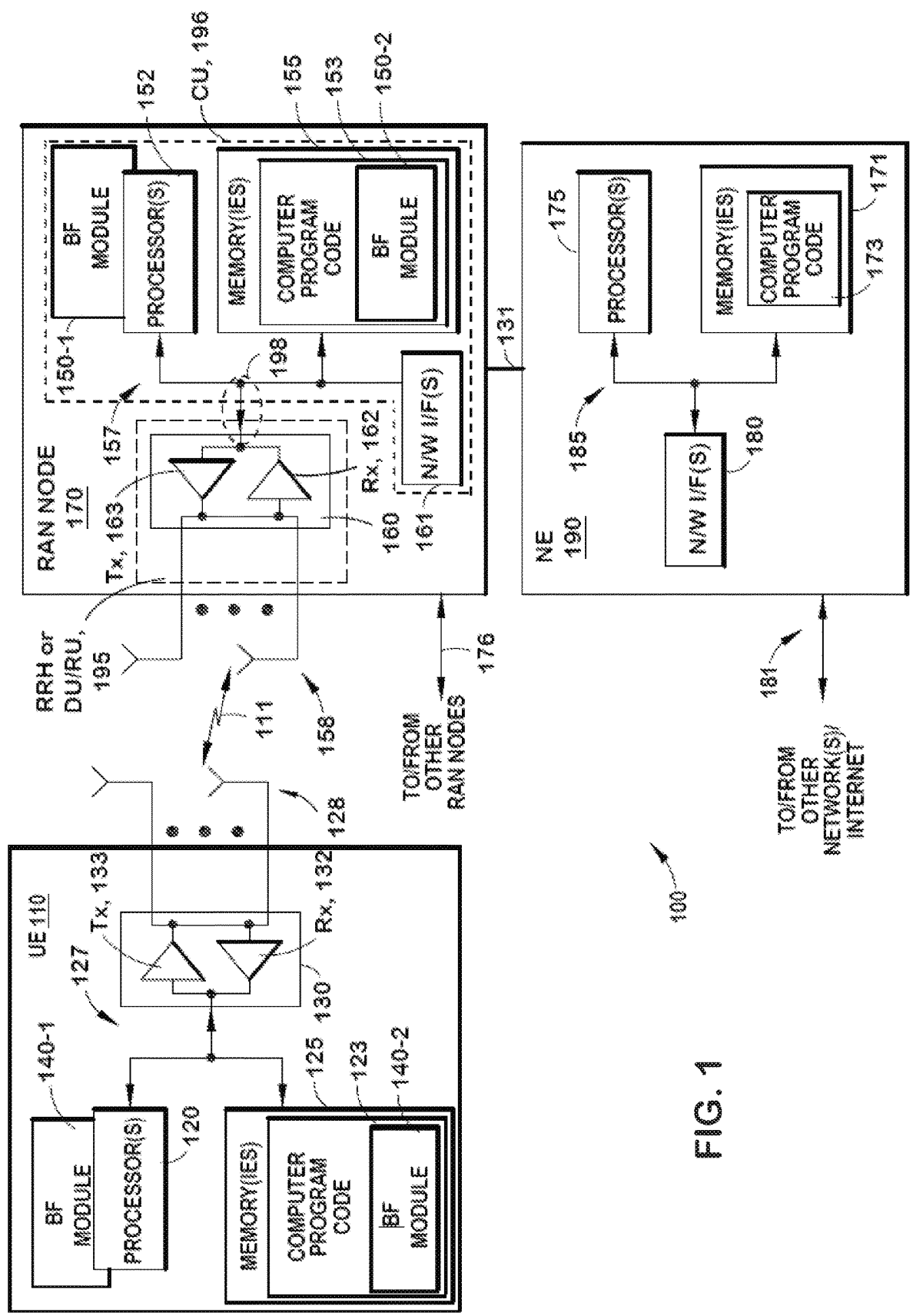
FIG. 1 is a block diagram of possible and non-limiting exemplary system in which the exemplary embodiments may be practiced.

The following abbreviations that may be found in the specification and/or the drawing figures are defined as follows:

3GPP third generation partnership project
5G fifth generation
5GC 5G core network
F access and mobility management function
CU central unit
DU distributed unit
eNB (or eNodeB) evolved Node B (e.g., an LTE base station)
EN-DC E-UTRA-NR dual connectivity E-UTRA evolved universal terrestrial radio access, i.e., the LTE radio access technology
gNB (or gNodeB) base station for 5G/NR, i.e., a node providing NR user plane and control plane protocol terminations towards the UE, and connected via the NG interface to the 5GC
I/F Interface
LTE long term evolution
MAC medium access control
MME mobility management entity
N/W or NW Network
NCE network control element
ng or NG new generation
ng-eNB new generation eNB
NR new radio
PDCP packet data convergence protocol
PHY physical layer
RAN radio access network
Rel Release
RLC radio link control
RRC radio resource control
RRH remote radio head
RU radio unit
Rx Receiver
SDAP service data adaptation protocol
SGW serving gateway
SMF session management function
TS technical specification
Tx Transmitter
UE user equipment (e.g., a wireless, typically mobile device)
UPF user plane function The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for deep learning eigen-beamforming. Additional description of these techniques is presented after a system into which the exemplary embodiments may be used is described.

Turning to FIG. 1, this figure shows a block diagram of one possible and non-limiting exemplary system in which the exemplary embodiments may be practiced. A user equipment (UE) 110, radio access network (RAN) node 170, and network control element(s) (NCE(s)) 190 are illustrated. In FIG. 1, a user equipment (UE) 110 is in wireless communication with a wireless network 100. A UE is a wireless, typically mobile device that can access a wireless network. The UE 110 includes one or more processors 120 one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a BF module, comprising one of or both parts 140-1 and/or 140-2, which may be implemented in a number of ways. The BF module may be implemented in hardware as BF module 140-1, such as being implemented as part of the one or more processors 120. The BF module 140-1 may be implemented also as an integrated circuit or through other hardware such as a programmable gate array. In another example, the BF module may be implemented as BF module 140-2, which is implemented as computer program code 123 and is executed by the one or more processors 120. For instance, the one or more memories 125 and the computer program code 123 may be configured to, with the one or more processors 120 cause the user equipment 110 to perform one or more of the operations as described herein. The UE 110 communicates with RAN node 170 via a wireless link 111.

The RAN node 170 is a base station that provides access by wireless devices such as the UE 110 to the wireless network 100. The RAN node 170 may be, for instance, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (e.g., the NCE(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-CU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a BF module, comprising one of or both parts 150-1 and/or 150-2, which may be implemented in a number of ways. The BF module may be implemented in hardware as BF module 150-1, such as being implemented as part of the one or more processors 152. The BF module 150-1 may be implemented also as an integrated circuit or through other hardware such as a programmable gate array. Note that the functionality of the BF module may be distributed, such as being distributed between the DU 195 and the CU 196, or be implemented solely in the DU 195. In another example, the BF module may be implemented as BF module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein.

The one or more network interfaces 161 communicate over a network such as via the links 176 and 131. Two or more gNBs 170 communicate using, e.g., link 176. The link 176 may be wired or wireless or both and may implement, e.g., an Xn interface for 5G, an X1 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, e.g., fiber optic cable or other suitable network connection to connect the other elements (e.g., a central unit (CU), gNB-CU) of the RAN node 170 to the RRH/DU 195. Reference 195 also indicates those suitable network connection(s).

It is noted that description herein indicates that "cells" perform functions, but it should be clear that the base station that forms the cell will perform the functions. The cell makes up part of a base station. That is, there can be multiple cells per base station. For instance, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network control element (NCE) (or elements, NCE(s)) 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the NCE(s) 190, and note that both 5G and LTE functions might be supported. The RAN node 170 is coupled via a link 131 to the NCE 190. The link 131 may be implemented as, e.g., an NG interface for 5G, or an S1 interface for LTE, or other suitable interface for other standards. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Having thus introduced one suitable but non-limiting technical context for the practice of the exemplary embodiments of this invention, the exemplary embodiments will now be described with greater specificity. The following notation is used in the description below: a bold capital letter indicates a matrix; a bold lowercase letter indicates a (column) vector, and a non-bold letter indicates a scalar. The dagger symbol, t, in superscript indicates the Hermitian operator.

Consider a system with K transmitting entities and a single receiving entity, for instance:
  K transmitting users and a single receiving base station in the uplink context; or
  K transmitting base stations and a single receiving user in a distributed downlink scenario.

Each transmitting entity has $N_t$ antenna elements and the single receiving entity has $N_r$ antenna elements. Let $N \triangleq \min(N_t, N_r)$ and $N_{rf} = N_r$ RF chains. Each transmitting entity has $N_1 \leq N$ transmitted layers. The beamformed received signal vector, with respect to some arbitrary entity k which transmission is of interest, is:

$$r=[r_1, \ldots, r_{N_r}]^T = \sqrt{\rho} W^\dagger H F x + W^\dagger n + W^\dagger i,$$

where $\rho$ is the transmitted power, $x=[x_1, \ldots, x_{N_l}]^T$ is the symbol vector with identity covariance matrix, $H$ is an $N_r \times N_t$ complex channel matrix, $F$ is an $N_t \times N_l$ complex precoding matrix at the transmitter and at the receiver, $W$ is an $N_r \times N_l$ complex combining matrix. $n=[n_1, \ldots, n_{N_r}]^T$ is the complex Gaussian noise and $i$ denotes the interference vector (sum of transmissions from other entities).

Of interest is the eigenvalue decomposition of the channel covariance matrix $R \triangleq H^\dagger H$ which is an $N_t \times N_t$ matrix, assuming $N = N_t \leq N_r$ (otherwise one should define $R \triangleq HH^\dagger$). It is noted that the conjugate transpose (Hermitian) of matrices $W$ and $H$ is denoted as notation $W^\dagger$ and $H^\dagger$, respectively.

In such a case, $$R = \lambda_1 v_1 v_1^\dagger + \ldots + \lambda_N v_N v_N^\dagger,$$

where $\lambda_1 > \ldots > \lambda_N \geq \lambda_N \geq 0$ are the eigenvalues and $v_1, \ldots, v_N$ are the corresponding eigenvectors. The optimal precoder for transmitting entity k is $F_{opt} = [v_1, \ldots, v_{N_l}]$. Let $u = Hv$ be an $N_r$-length vector, then the (single-user) optimal combiner at the single receiving entity is $W_{opt} = [u_1, \ldots, u_{N_l}]$.

One scheme to perform EVD is via the power iteration method. Given an arbitrary vector:

$$v_0 = a_1 v_1 + \ldots + a_N v_N$$

and $a_1 \neq 0$, meaning the initial vector is not orthogonal to the dominant eigenvector, then $$\tilde{v}_1 = (R)^n v_0 = a_1 \lambda_1^n v_1 + \ldots + a_N \lambda_N^n v_N = a_1 \lambda_1^n \left( v_1 + \frac{a_2 \lambda_2^n}{a_1 \lambda_1^n} v_2 + \ldots + \frac{a_N \lambda_N^n}{a_1 \lambda_1^n} v_N \right) \approx a_1 \lambda_1^n v_1.$$

Hence $$\hat{v}_1 = \frac{\tilde{v}_1}{\|\tilde{v}_1\|} \approx v_1$$

so to reveal the single-mode optimal precoder $F_{opt} = \hat{v}_1$. The power iteration method converges faster as the eigenvalues are more spread, for example, for more correlated channel covariance matrix $R$ and when the $R$ matrix's rank $N \triangleq \min(N_t, N_r)$ reduces.

The same goes with $u_1$ to determine the single-mode optimal combiner $W_{opt} = \hat{u}_1$. It can be computed either directly via $\hat{u}_1 = H\hat{v}_1$ or by running the power iteration for $R \triangleq HH^\dagger$ (assuming $N = N_t \leq N_r$, otherwise $R \triangleq H^\dagger H$).

For multiple layers, suppose the dominant eigenvector $\hat{v}_1$ was found as presented previously. Now, given an arbitrary vector $$v_0 = b_1 v_1 + \ldots + b_N v_N,$$

this time with $b_2 \neq 0$ (i.e., it is not orthogonal to the $2^{nd}$ dominant eigenvector), define $$\tilde{v}_0 \triangleq (I - \hat{v}_1 \hat{v}_1^\dagger) v_0.$$

Thus, $$\tilde{v}_2 = (R)^n \tilde{v}_0 = (R)^n (I - \hat{v}_1 \hat{v}_1^\dagger)(b_1 v_1 + \ldots + b_N v_N) =$$
$$(R)^n \left( b_1 v_1 + \ldots + b_N v_N - \hat{v}_1 \hat{v}_1^\dagger (b_1 v_1 + \ldots + b_N v_N) \right) =$$
$$(R)^n (b_1 v_1 + \ldots + b_N v_N - b_1 \hat{v}_1) =$$
$$(R)^n (b_2 v_2 + \ldots + b_N v_N) = b_2 \lambda_2^n v_2 + \ldots + b_N \lambda_N^n v_N =$$
$$b_2 \lambda_2^n \left( v_2 + \frac{b_3 \lambda_3^n}{b_2 \lambda_2^n} v_3 + \ldots + \frac{b_N \lambda_N^n}{v_2 \lambda_2^n} v_N \right) \approx b_2 \lambda_2^n v_2.$$

Hence $$\hat{v}_2 = \frac{\tilde{v}_2}{\|\tilde{v}_2\|} \approx v_2$$

to get the $2^{nd}$ dominant eigenvector and set the dual-mode optimal precoder $F_{opt} = [\hat{v}_1, \hat{v}_2]$. The same goes with $u_2$ to determine the dual-mode optimal combiner $W_{opt} = [\hat{u}_1, \hat{u}_2]$. This can be achieved either directly via $\hat{u}_2 = H\hat{v}_2$ or running the power iteration for $R \triangleq HH^\dagger$ (assuming $N = N_t \leq N_r$, otherwise $R \triangleq H^\dagger H$). For 3 layers run the power iteration with a vector $$\tilde{\tilde{v}} \triangleq (I - \hat{v}_1 \hat{v}_1^\dagger - \hat{v}_2 \hat{v}_2^\dagger) v_0,$$

where the arbitrary vector $$v_0 = c_1 v_1 + \ldots + c_N v_N$$

and $c_3 \neq 0$, and set $F_{opt} = [\hat{v}_1, \hat{v}_2, \hat{v}_3]$, $W_{opt} = [\hat{u}_1, \hat{u}_2, \hat{u}_3]$. And so forth for more layers.

Another scheme is to first orthogonalize, via a Gram-Schmidt process, a random matrix and then iteratively run it through a power iteration, as implemented in the following pseudo-code

```
1: V = some initial matrix of size N_r x N_l (for instance
   randn(N_r,N_l)+1i*randn(N_r,N_l), where 1i denotes √−1 )
2: For t=1:MAX_ITER
3:     V = RV
4:     V = gram_schmidt(V)
5: End
```

Various example embodiments described herein provide improvements to the power iteration schemes above for eigen-beamforming in a cost-effective manner. For example, various example embodiments provide an improved power iteration method with learned per-iteration weight matrix. Some example embodiments yield superior performance to the classical power iteration method with an attractive computational complexity which is only quadratic in the channel's covariance matrix dimension, rather than cubic as for other examined alternatives like Lanczos-Gram Schmidt and partial SVD. Some of the techniques described herein can also be used in TDD mode for beamforming without explicit CSI knowledge at either the transmitter or the receivers. It is noted that providing improved power iteration for eigen-beamforming in a cost-effective manner is particularly important in, for example, less correlated (e.g. towards Rayleigh) channels where power iteration is expected to converge rather slowly.

Figure 2:
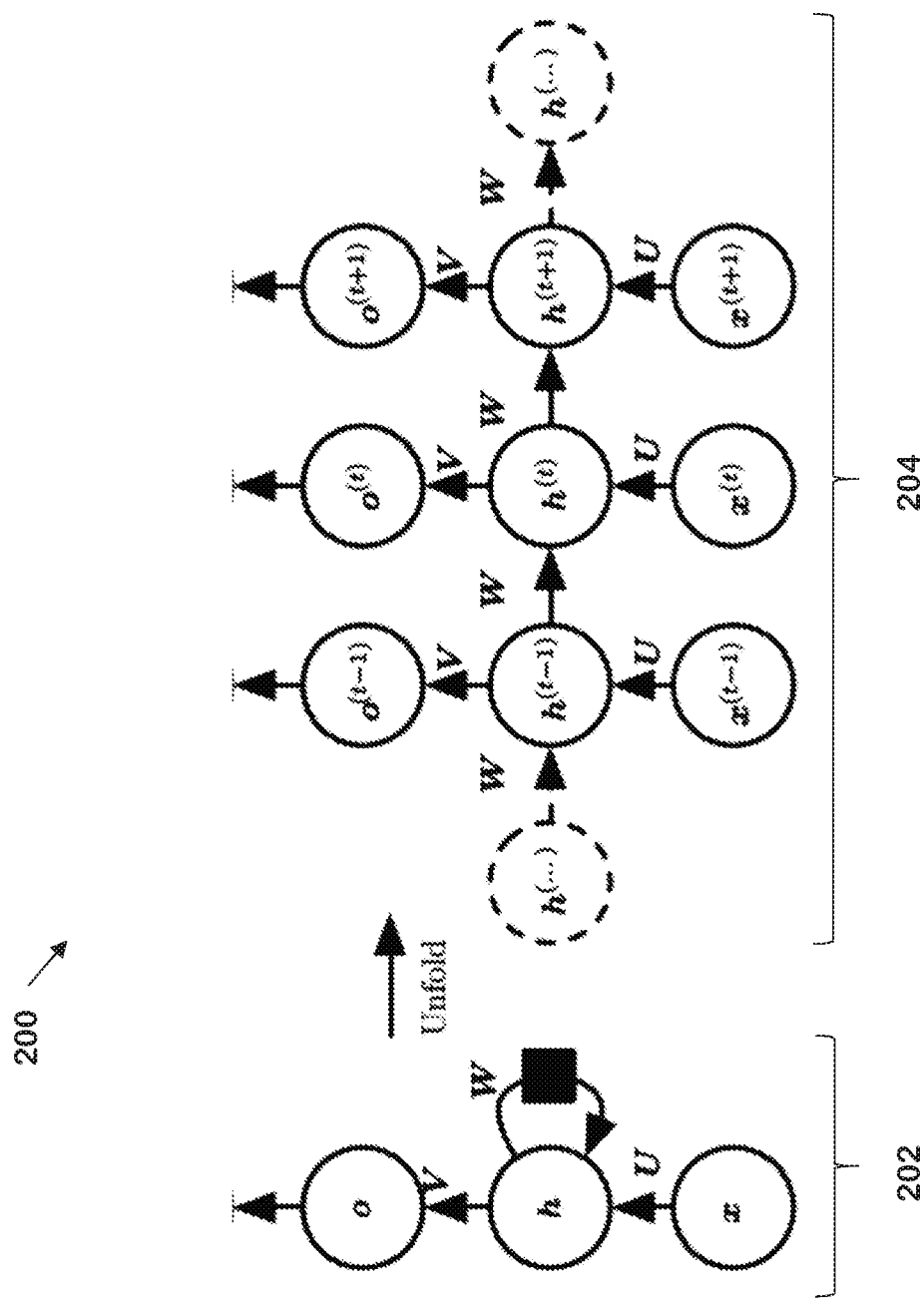
FIG. 2 is an example of a deep learning architecture in accordance with exemplary embodiments.

Referring now to FIG. 2, a deep learning architecture 202 known as RNN (recurrent neural network (NN)) as well as an unfolded version 204 of the RNN are shown. In the example RNN architecture shown in FIG. 2, the folded version 202 includes: an input layer, x; one or more hidden layers, h; and an output layer, o. In the unfolded version 204 of the RNN, $x^{(t)}$ is the input at time step t and is a vector of size N $h^{(t)}$ and $o^{(t)}$ are the hidden state and output states at time step t, respectively. W denotes the connection weights between the hidden states of the unfolded layers, U denotes the connections weights between the input and hidden layers, and V denote the connection weights between the hidden and output layers.

The conventional power iteration method can be recast to an RNN without learning, namely, the NN weights are kept fixed across the NN layers.

For example, the conventional power iteration method may be expressed as the following RNN:
Set the input-to-hidden connections weight matrix U=I (identity matrix)
Set the hidden-to-output connections weight matrix V=I
Set the bias vectors b=0 and c=0
Other than input $x^{(0)}$, all $x^{(t)}$=0
Place an identity activation function (f(z)=z).
Set the hidden-to-hidden weight matrix W=R to be fixed across (unfolded) layers.

Thus, the RNN weights are said to be untrained, or unlearned. No learning, in this sense, generally means a less adaptive neural network $o^{(t)} = h^{(t)} = Wh^{(t-1)} = Rh^{(t-1)}$ and $x^{(0)} = v_0$.

This architecture can be substantially improved by allowing adaptation or learning of weights across the RNN layers. In order to have an RNN learn the EVD from an arbitrary vector, the above described RNN is changed as follows:
Set the hidden-to-hidden weight matrix to be learned from the output of the previous (unfolded) layer in the following way:

$$W^{(t)} = I + \alpha(h^{(t-1)\dagger}h^{(t-1)}R - h^{(t-1)\dagger}Rh^{(t-1)}I),$$

where $\alpha$ is the learning rate and $o^{(t)} = h^{(t)} = W^{(t)}h^{(t-1)}$ and $x^{(0)} = v_0$.

In some example embodiments, the learning rate may be adaptively adapted based on one or more performance merits, such as minimizing the RMSE of the inferred eigenvectors.

Such a choice of learned (Hermitian) matrix $W^{(t)}$ indeed yields the desired dominant eigenvector R as its fixed point:

$$h^{(t)} = W^{(t)}h^{(t-1)} = (h^{(t-1)} + \alpha(h^{(t-1)\dagger}h^{(t-1)}R - h^{(t-1)\dagger}Rh^{(t-1)}I)h^{(t-1)}.$$

The fixed point $h^{(\infty)}$ for which the derivative of the hidden state is zero may be found by:

$$\frac{dh}{dt} = \frac{h^{(t)} - h^{(t-1)}}{\alpha} = (h^{(t-1)\dagger}h^{(t-1)}R - h^{(t-1)\dagger}Rh^{(t-1)}I)h^{(t-1)} = 0.$$

Note that any eigenvector $h^{(\infty)} = v$ of R solves the above equation, since $$(v^\dagger vR - v^\dagger Rv I)v = Rv - \lambda v = 0$$

Now, inputting the RNN with an arbitrary vector $x^{(0)} = v_0 = v_0 a_1 v_1 + \ldots + a_N v_N$ and $a_1 \neq 0$, then:

$$\tilde{v}_1 =$$

$$o^{(t)} = (W^{(t)})(W^{(t-1)}) \ldots (W^{(1)})x^{(o)} = a_1 \prod_{\tau=1}^{t} \lambda_1^{(\tau)} v_1 + \ldots + a_N \prod_{\tau=1}^{t} \lambda_N^{(\tau)} v_N =$$

$$a_1 \prod_{\tau=1}^{t} \lambda_1^{(\tau)} \left( v_1 + \frac{a_2 \prod_{\tau=1}^{t} \lambda_2^{(\tau)}}{a_1 \prod_{\tau=1}^{t} \lambda_1^{(\tau)}} v_2 + \ldots + \frac{a_N \prod_{\tau=1}^{t} \lambda_N^{(\tau)}}{a_1 \prod_{\tau=1}^{t} \lambda_1^{(\tau)}} v_N \right) \approx a_1 \prod_{\tau=1}^{t} \lambda_1^{(\tau)} v_1.$$

Thus, given an input vector which is not orthogonal to the dominant eigenvector of R, the RNN converges to that dominant eigenvector. As may be expected, simulation results show that using learned weights $W^{(t)}$, rather than unlearned ones as in power iteration (i.e. fixed), yields substantially faster convergence of the RNN.

Figure 3:
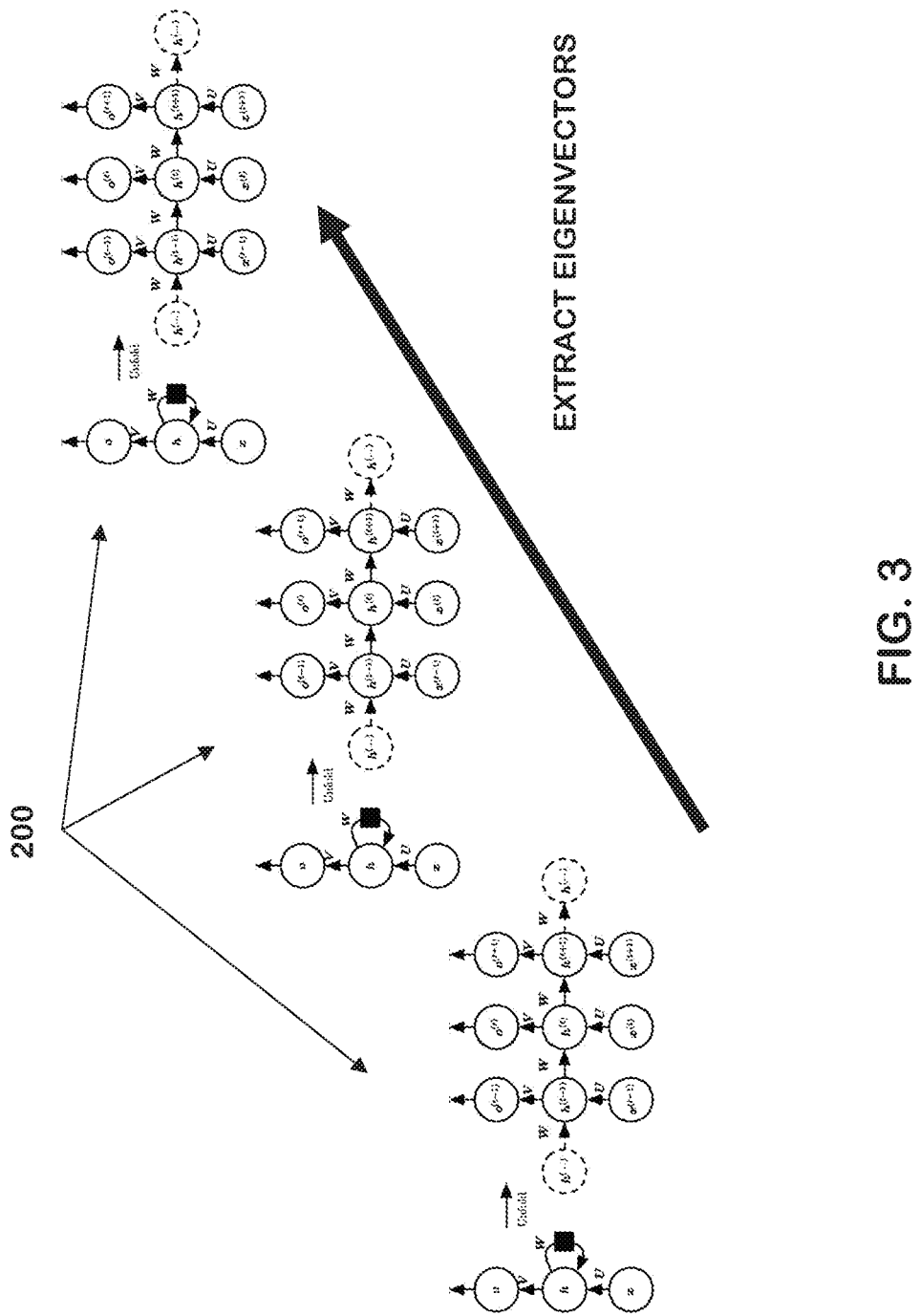
FIG. 3 is an example of extracting eigenvector for transmission in multiple layers in accordance with exemplary embodiments.

Referring now to FIG. 3, this figure shows an example of an embodiment for transmission in multiple layers. For transmission in multiple layers another identical RNN can be concatenated with a different initialization, namely:

$$x^{(0)} = (I - o^{(\infty)} o^{(\infty)\dagger}) v_0,$$

where $v_0 = b_1 v_1 + \ldots + b_N v_N$ and $b_2 \neq 0$, and $o^{(\infty)}$ is the converged output of the previous RNN. Thus, as shown for the power iteration in multiple layers, the output of this RNN would converge to $o^{(\infty)} = \tilde{v}_2$, the $2^{nd}$ dominant eigenvector. In the example shown in FIG. 2, three RNNs 200 are concatenated to obtain the eigenvectors corresponding to three layers. However, this is not intended to be limiting and it should be understood that as many RNNs can be concatenated as the number of layers (i.e. desired eigenvectors) will compose the optimal beamformers.

The proposed scheme according to some example embodiments improve power iteration methods by replacing in the power iteration method the matrix R with learned $W_i^{(t)}$, as described in, for example, the following pseudo-code:

```
1:    R ≜ H†H
2:    v_0 = 0
3:    α is a (typically small) scalar
4:    For l=1:N_l
5:        h^(0) = (I - v_{l-1}v_{l-1}†) * (some initial
              N_r-length vector, e.g. randn(N_r,1)+1i*randn(N_r,1))
6:        For t=1:MAX_ITER
7:            W^(t) = I + α (h^(t-1)†h^(t-1)R - h^(t-1)†Rh^(t-1)I)
8:            h^(t) = w^(t)h^(t-1) / ||w^(t)h^(t-1)||
9:        End
10:       v_l = h^(MAX_ITER)
11:   End
12:   Precoder F_opt = [v_1, ... , v_{N_l}]
13:   Combiner W_opt = HF_opt
```

Similar to the power iteration method, the proposed scheme according to some of the example embodiments may also be used with the Gram-Schmidt orthogonalization process as shown, for example, in the following pseudo-code:

```
1: R ≜ H†H
2: α is a (typically small) scalar
3: V = some initial matrix of size N_t x N_l
4: For t=1:MAX_ITER
5:     W_i^(t) = I + α(R - v_i†Rv_i I)
6:     V = [W_1^(t)v_1, ... , W_{N_l}^(t)v_{N_l}]
```

-continued

```
7:      [v₁, ... , v_{Nj}] = gram_schmidt(V)
8: End
9: Precoder F_{opt} = [v₁, ... , v_{Nj}]
10: Combiner W_{opt} = HF_{opt}
```

For TDD systems, one property of the proposed scheme is that there is there is no need for CSI at either side of the transceiver due to channel reciprocity. In TDD systems, the proposed scheme according to some embodiments may be performed by echoing back and forth the random transmission until convergence to the eigen-beamforming vectors.

Complexity

According to some example embodiments, the RNN-based beamforming may be implemented via an existing power iteration-based hardware architecture. This may be done, for example, by replacing the fixed R matrix in the power iteration implementation with the learned $W^{(t)}$ matrix. On the one hand, there is an additional overhead in computing the RNN's $W^{(t)}$ in each iteration, in contrast to the fixed R as in power iteration. On the other hand, the number of required iterations using RNN is typically reduced due to the faster convergence.

Let the number of iterations required to achieve a certain estimation error with power iteration be t, and the number of required iterations to do so with RNN be c·t(0<c<1). Then $2c·t(N_r^2+N_r)$ operations are overall added for computing $W^{(t)}$, while $(1-c)·tN_r^2$ operations are saved by the faster convergence of the RNN for not having to compute $Rh^{(t-1)}$ for (1−c)·t times. Hence as long as $$2c·t(N_r^2+N_r)<(1-c)·tN_r^2,$$

the RNN implementation not only improves performance but also saves operations compared to standard power iteration, or namely $$c < \frac{N_r}{4N_r + 2},$$

which, for large $N_r$, yields c≤1/3. Numerical simulations are now detailed showing that such an expedited convergence is indeed observed when using the scheme of various example embodiments.

In some example embodiments, training the RNN may be done online or periodically and frequently enough to keep track of any channel spatial correlation changes, namely, keep track of beams directivity. For example, training of the RNN may be performed within edge equipment, such as by a user equipment (e.g. UE 110) or by a base station (e.g. RAN Node 170). In some examples, such as when channel changes relatively slowly, the training may also be performed via one or more computers (such as a via a cloud architecture for example) and the weights may then be distributed to the edge equipment.

Performance Simulations

In a first simulated case: $N_t=2$, $N_r=64$, $N_j=2$, H is averaged over 1000 realizations of 64×2 Rayleigh channel, the learning rate was fixed to α=0.1 (0.05) for the dominant (2nd dominant) eigenvector and the same initialization for all examined methods was used in the form of taking the (normalized) column of R with the maximal norm.

Figure 4:
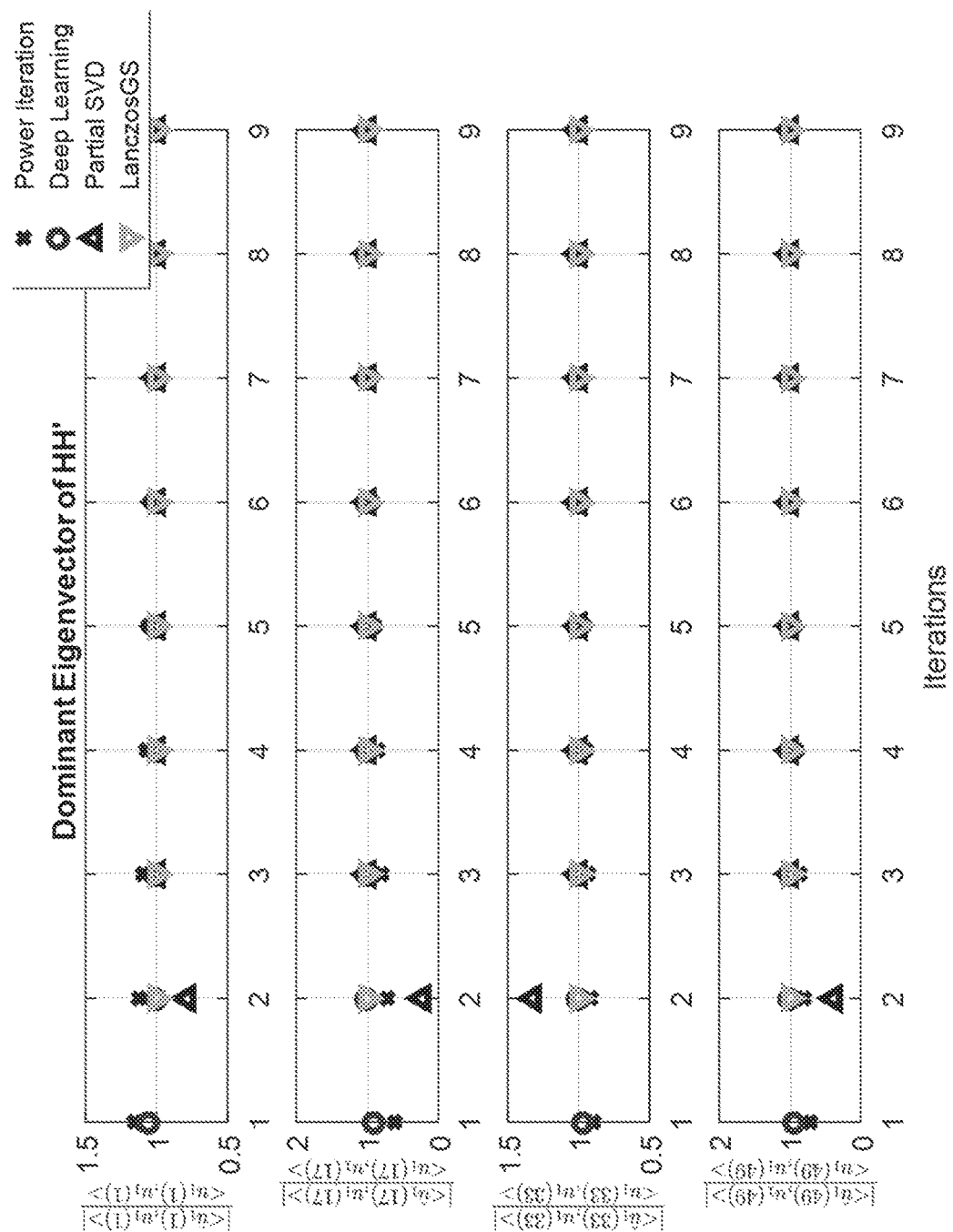
FIGS. 4-7 show data corresponding to a first simulation scenario in accordance with exemplary embodiments.

FIG. 4 plots the normalized inner product of the estimated dominant eigenvector as a function of the number of iterations using four different methods, i.e., power iteration, deep learning partial SVD, and LanczosGS. FIG. 4 shows plots for four specific entries, namely: 1, 17, 33 and 49 (out of 64). It can be seen from FIG. 4, that there is a faster convergence to unity of the deep learning-based scheme as compared to the conventional power iteration scheme.

Figure 5:
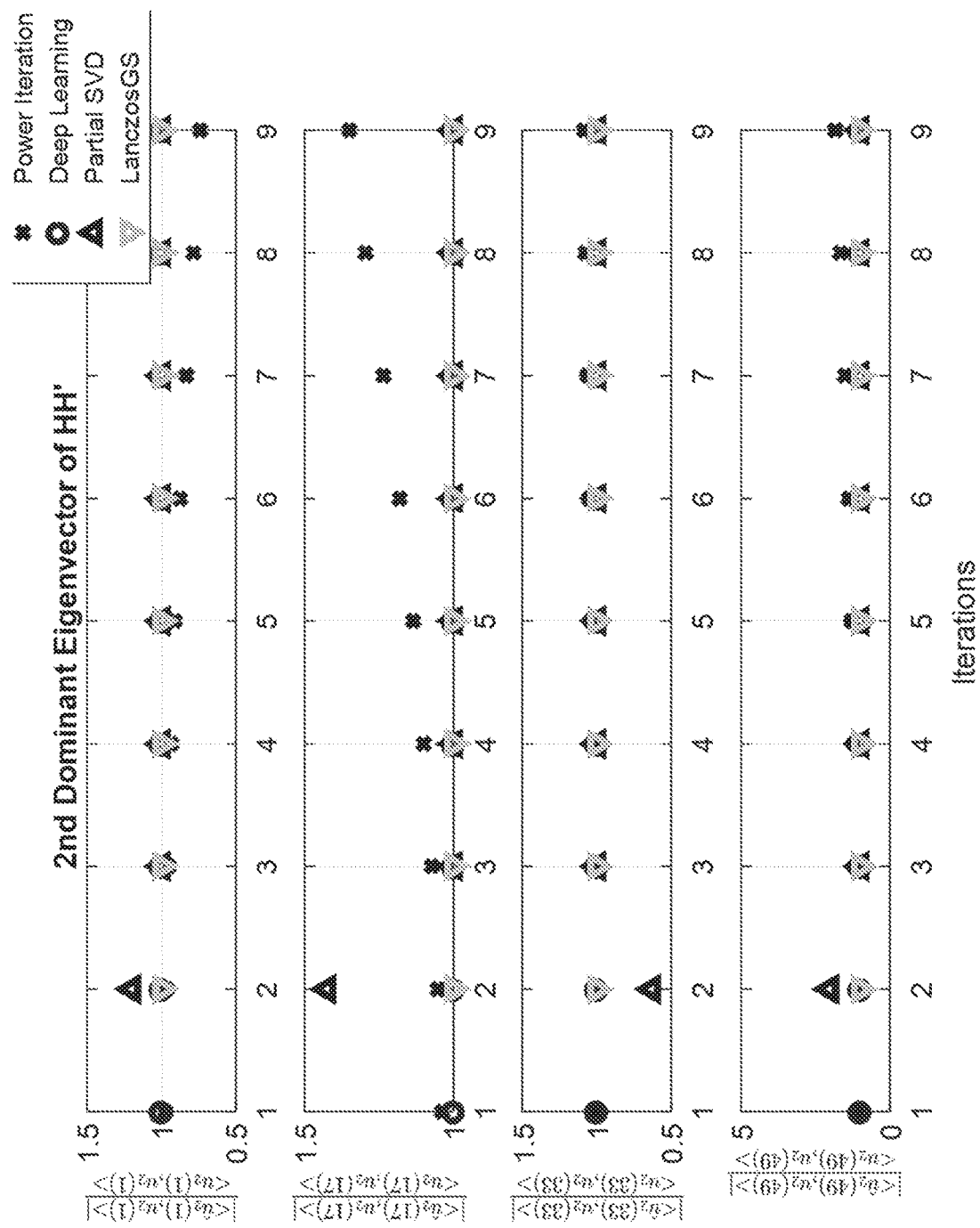

FIG. 5 plots the normalized inner product of the estimated $2^{nd}$ dominant eigenvector as a function of the number of iterations using the four different methods. Similar to FIG. 4, there is a faster convergence to unity of the deep learning-based scheme as compared to the conventional power iteration scheme for the $2^{nd}$ dominant eigenvector.

Figure 6:
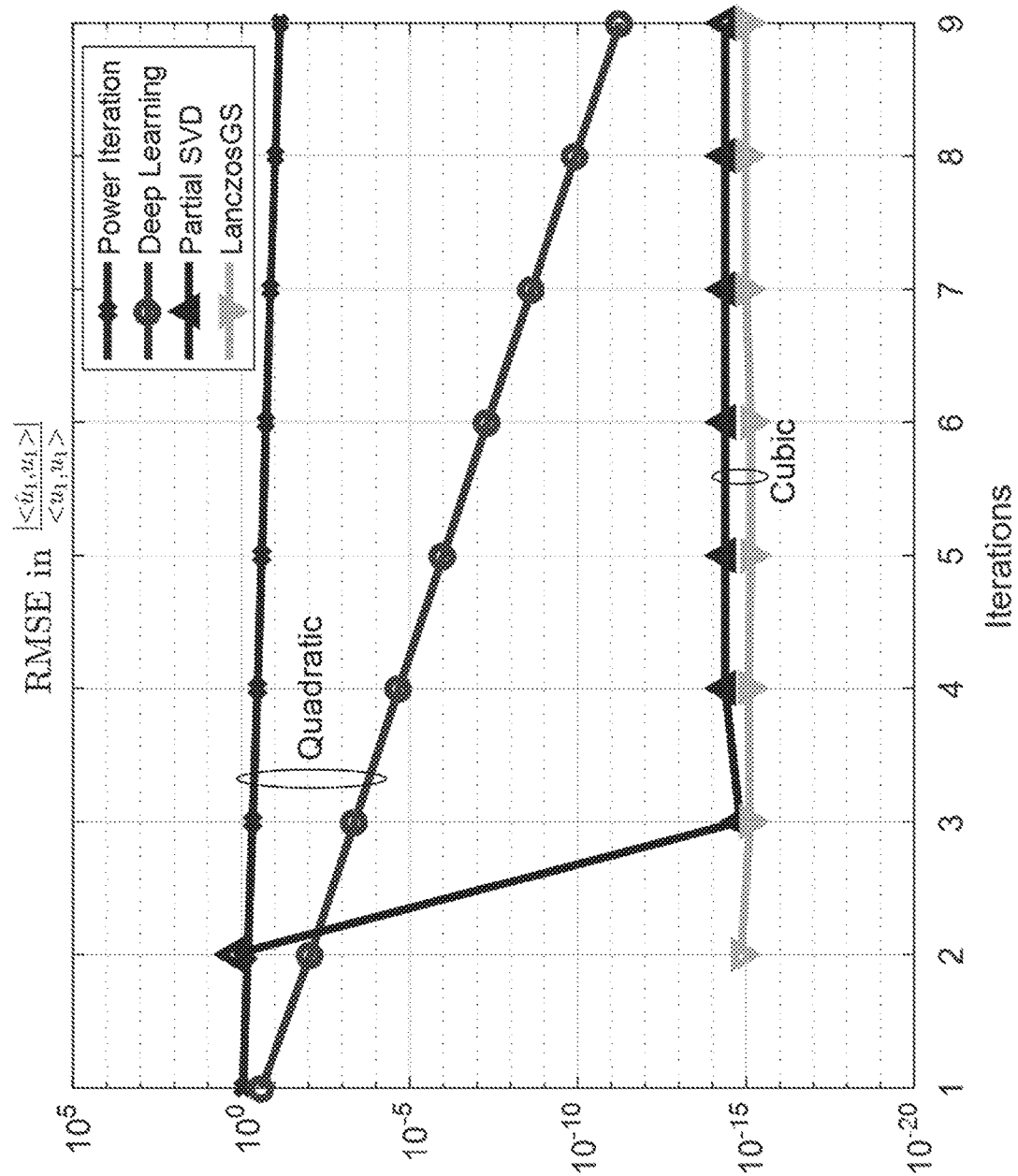
Figure 7:
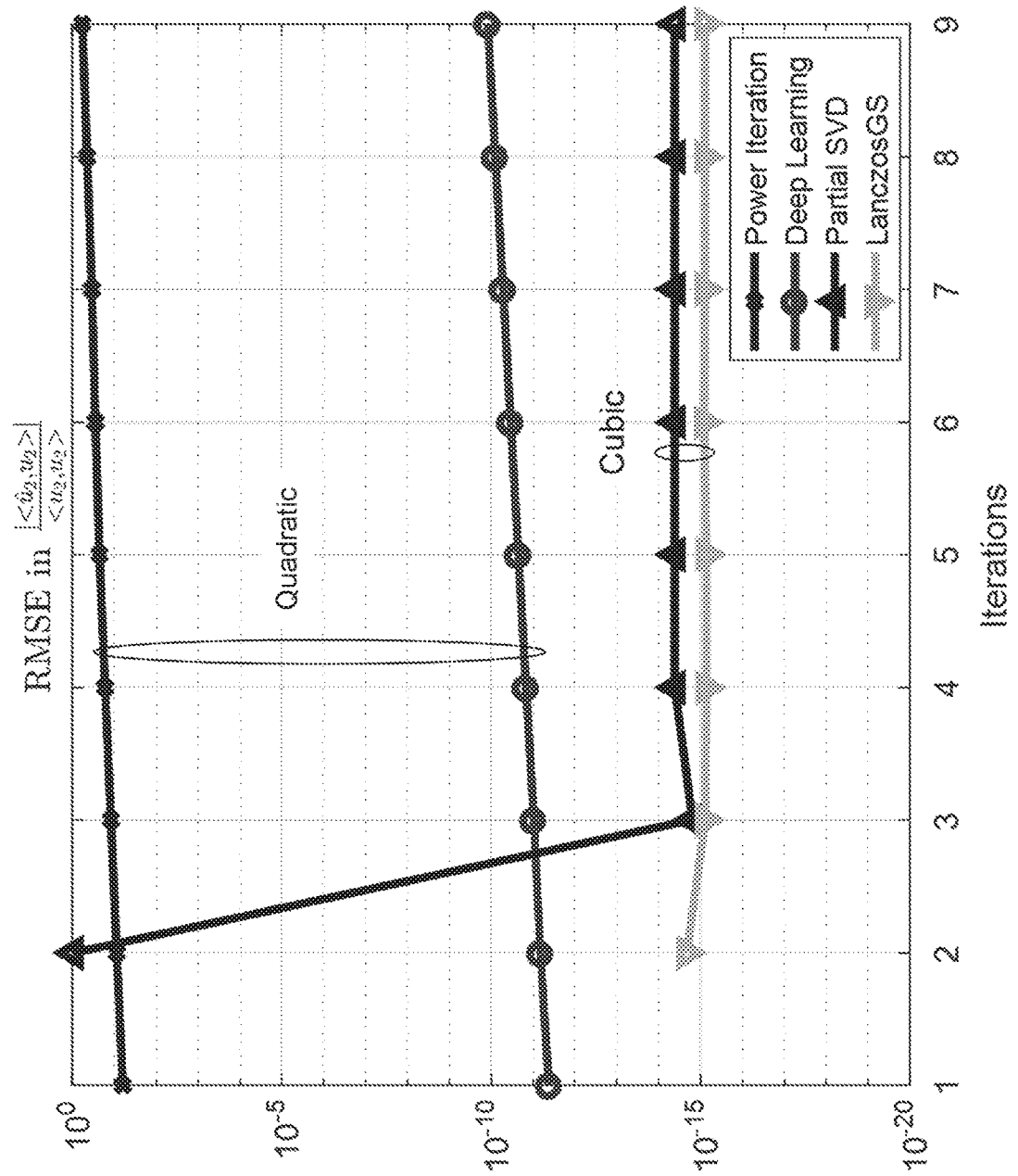

FIG. 6 shows the root-mean-square-error (RMSE) in estimating the (normalized) inner product of the dominant eigenvector via the four examined methods versus the iteration number. As can be seen from FIG. 6, the proposed deep learning driven scheme exhibits substantially better performance than ordinary power iteration method with a comparable quadratic complexity order. The two other methods, though yielding lower RMSE, demand an overwhelming order of magnitude more computations. In particular, the partial SVD and LanczosGS methods have a cubic as opposed to quadratic complexity order FIG. 7 shows the root-mean-square-error (RMSE) in estimating the (normalized) inner product of the $2^{nd}$ dominant eigenvector via the four examined methods versus the iteration number. The behavior in FIG. 7 is similar to as in FIG. 6 for the $2^{nd}$ dominant eigenvector.

In a second simulated case, the same setup is used as for the first simulated case, but with 4 transmitting antennas, i.e. $N_t=4$. The learning rate was fixed to α=0.11 (0.145) for the dominant (2nd dominant) eigenvector. The same initialization for all examined methods is used by taking the (normalized) column of R with maximal norm.

Figure 8:
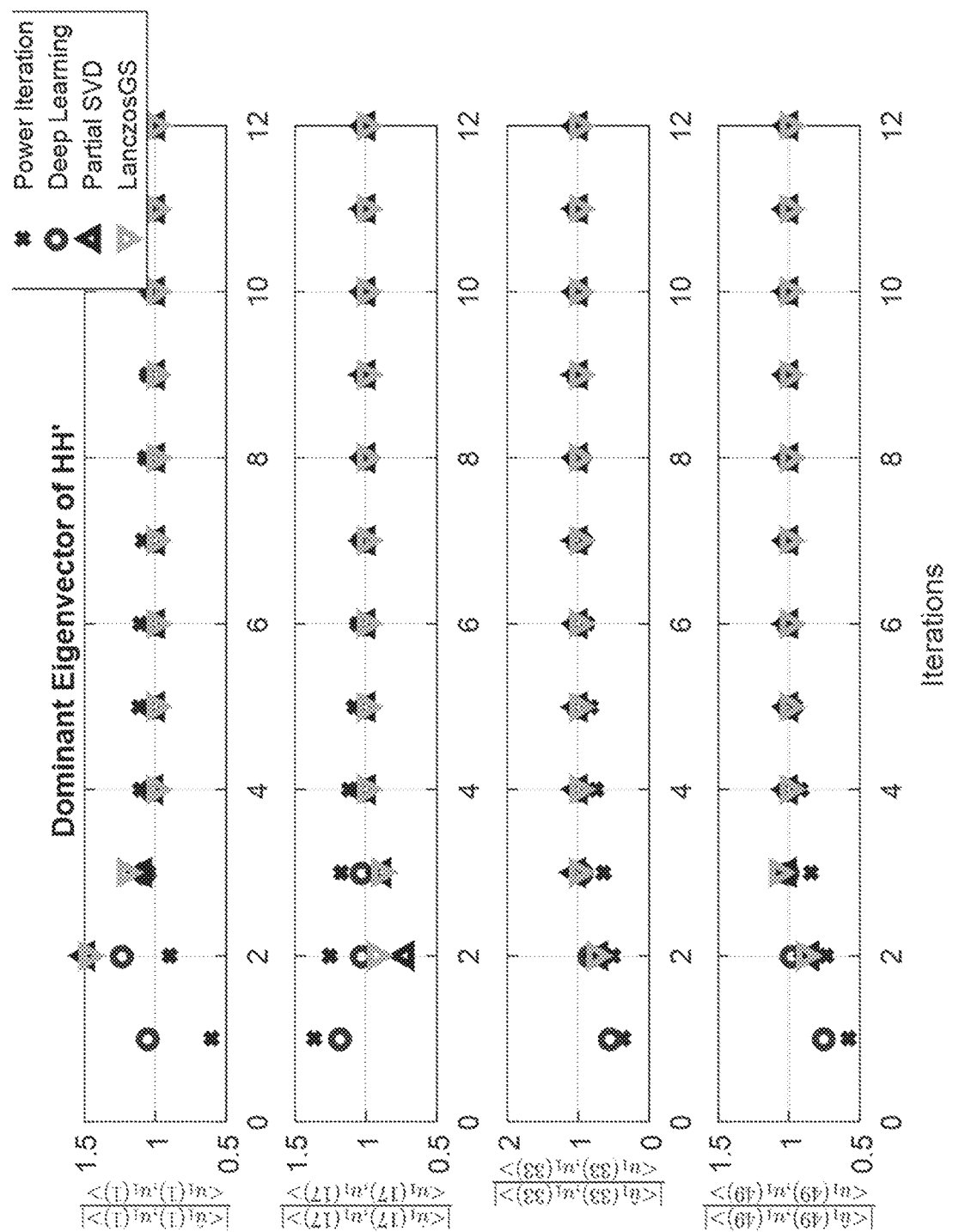
FIGS. 8-11 show data corresponding to a second simulation scenario in accordance with exemplary embodiments.
Figure 9:
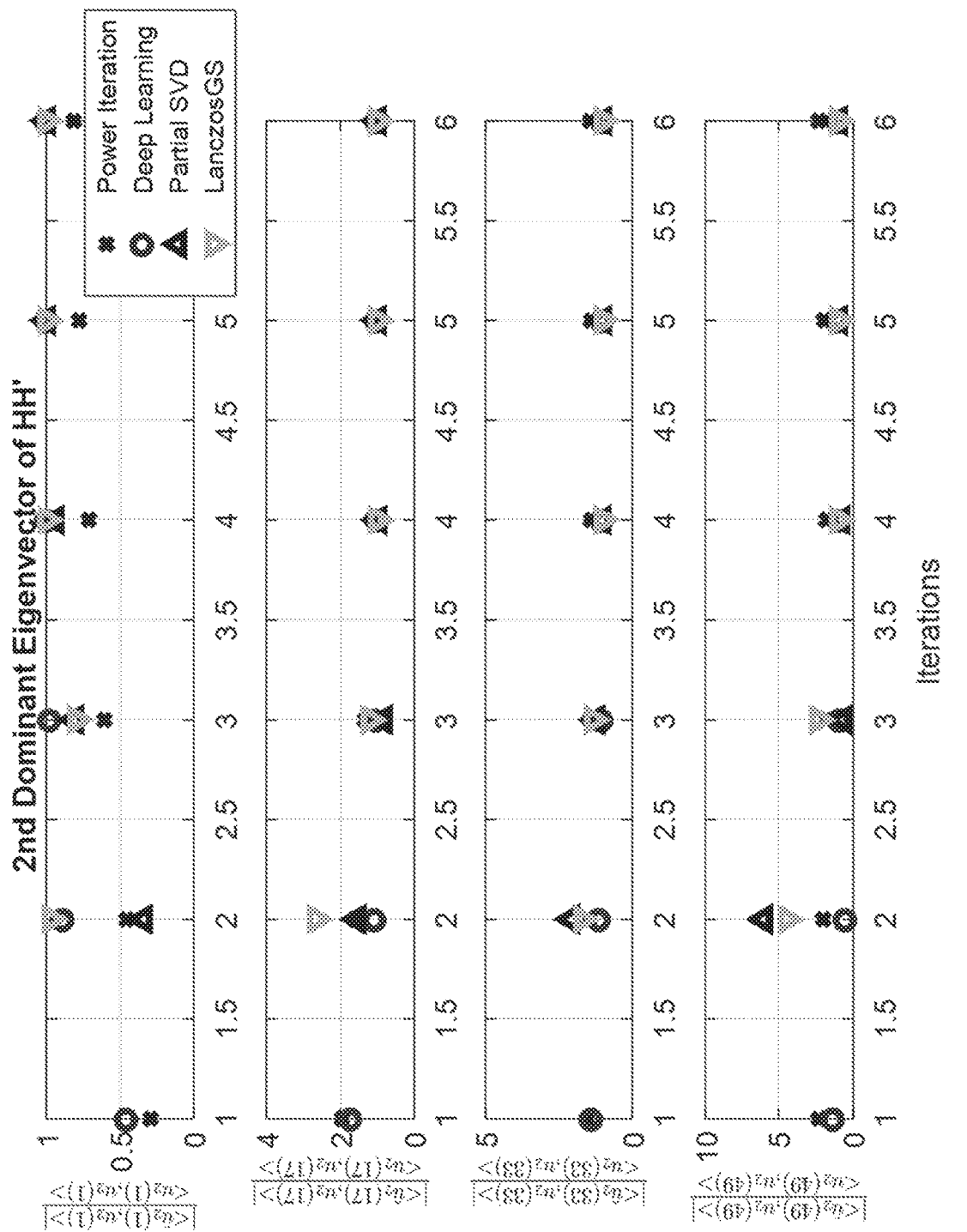
Figure 10:
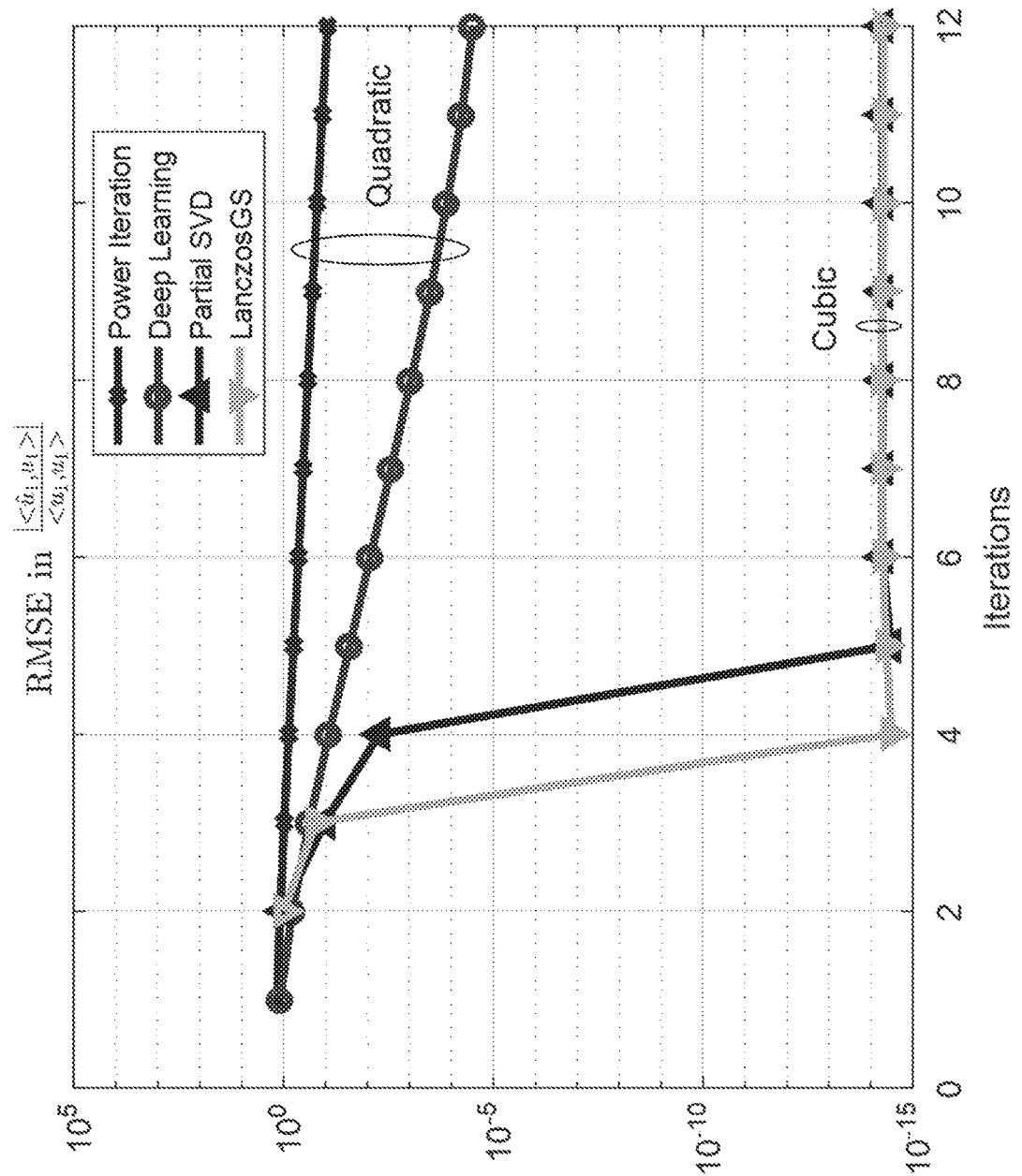
Figure 11:
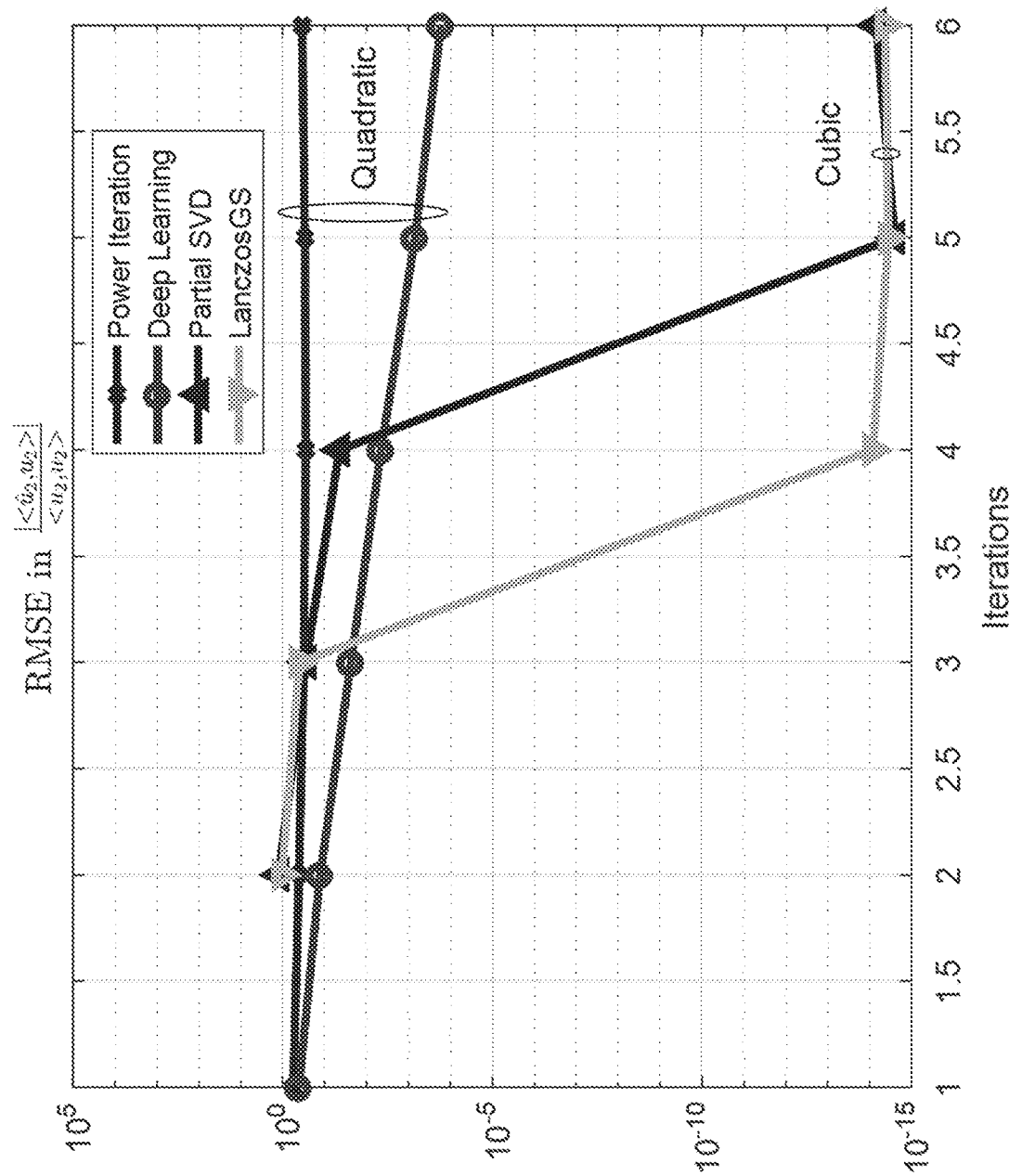

FIGS. 8 and 9 show the normalized inner product of the estimated dominant eigenvector and $2^{nd}$ dominant eigenvector, respectively, for the second simulated case; and FIGS. 10-11 show the root-mean-square-error (RMSE) in estimating the (normalized) inner product of the dominant eigenvector and $2^{nd}$ dominant eigenvector, respectively via the four examined methods versus the iteration number for the second simulated case. Similar to FIGS. 4-7, FIGS. 8-11 show that the deep learning technique performs better than the power iteration technique, while offering far less complexity than the other two techniques (i.e. partial SVD and LanczosGS).

As for the learning rate, in some example embodiments the learning rate may be adapted automatically, rather than remain fixed as in the first and second simulated cases. For example, any suitable algorithm may be used, such as ADAGRAD (adaptive gradient) for example, for dynamically determining the learning rate α.

Figure 12:
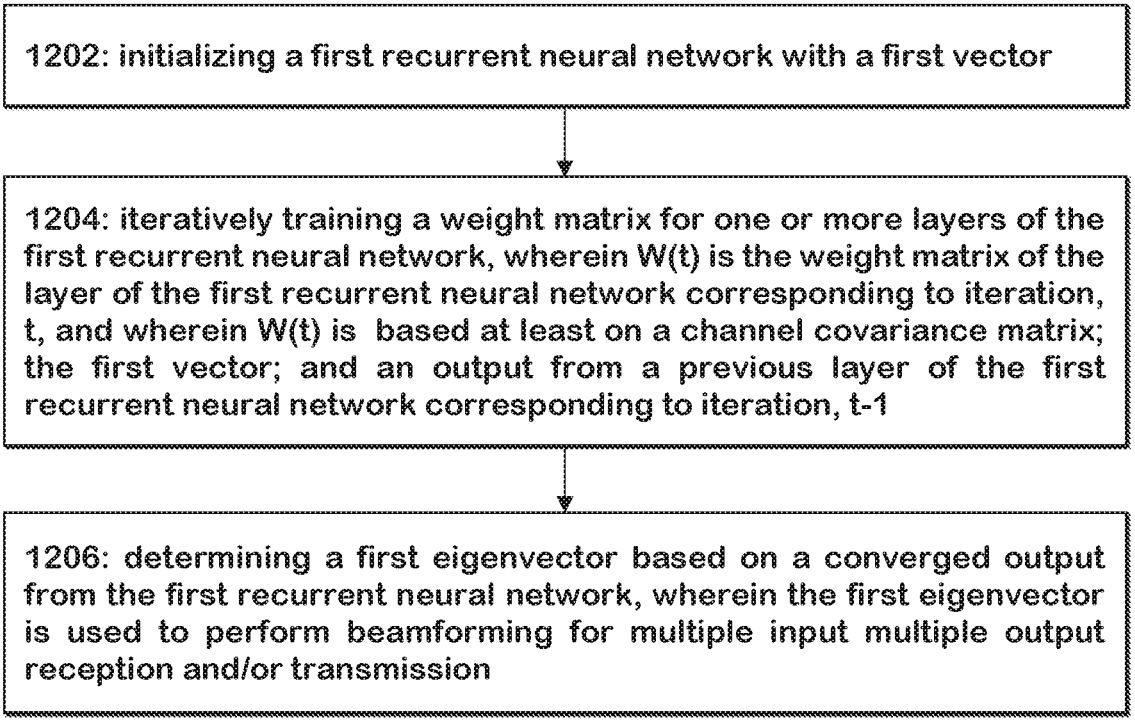
FIG. 12 is a logic flow diagrams for deep learning eigen-beamforming, and illustrates the operation of exemplary methods, a result of execution of computer program instructions embodied on a computer readable memory, functions performed by logic implemented in hardware, and/or interconnected means for performing functions in accordance with exemplary embodiments.

FIG. 12 is a logic flow diagram for deep learning eigen-beamforming. This figure further illustrates the operation of an exemplary method or methods, a result of execution of computer program instructions embodied on a computer readable memory, functions performed by logic implemented in hardware, and/or interconnected means for performing functions in accordance with exemplary embodiments. For instance, the BF module 140-1 and/or 140-2 (and/or the BF module 150-1 and/or 150-2) may include multiples ones of the blocks in FIG. 12, where each included block is an interconnected means for performing the function in the block. The blocks in FIG. 12 are assumed to be performed by the UE 110 and/or the RAN Node 170 at least in part, for example, under control of the BF module 140-1 and/or 140-2 and BF module 150-1 and/or 150-2, respectively.

According to an example of an embodiment (which may be referred to as example 1), a method is provided including: initializing a first recurrent neural network with a first vector as indicated by block 1202; iteratively training a weight matrix for one or more layers of the first recurrent neural network, wherein $W^{(t)}$ is the weight matrix of the layer of the first recurrent neural network corresponding to iteration, t, and wherein $W^{(t)}$ is based at least on a channel covariance matrix; the first vector; and an output from a previous layer of the first recurrent neural network corresponding to iteration, t−1 as indicated by block 1204; and determining a first eigenvector based on a converged output from the first recurrent neural network, wherein the first eigenvector is used to perform beamforming for multiple input multiple output reception and/or transmission as indicated by block 1204.

An example of a further embodiment (which may be referred to as example 2), is a method as in example 1, the method including using a series of one or more further recurrent neural networks to determine one or more further eigenvectors, wherein: the one or more further recurrent neural networks are identical to the first recurrent neural network, and each further recurrent neural network is initialized with second vector, where the second vector is based at least on a converged output of the previous recurrent neural network.

An example of a further embodiment (which may be referred to as example 3), is a method as in example 2, wherein at least one of: a number of the one or more further eigenvectors corresponds to a number of data layers used in the transmission multiple input multiple output reception and/or transmission; and the one or more further eigenvectors comprises all remaining eigenvectors.

An example of a further embodiment (which may be referred to as example 4), is a method as in any one of examples 2-3, wherein at least one of: a Gram-Schmidt process is applied to at least the first eigenvector and the one or more further eigenvectors; and iteratively training the weight matrix comprises applying a power iteration method.

An example of a further embodiment (which may be referred to as example 5), is a method as in any one of examples 1-4, wherein the weight matrix, $W^{(t)}$ comprises a Hermitian matrix.

An example of a further embodiment (which may be referred to as example 6), is a method as in any one of examples 1-5, wherein the channel covariance matrix, is based at least on: a number of antenna elements of a transmitting entity and a number of antenna elements of each of two or more receiving entities; and a number of antenna elements of two or more transmitting entities and a number of antenna elements of a receiving entity.

An example of a further embodiment (which may be referred to as example 7), is a method as in any one of examples 1-6, wherein the weight matrix, $W^{(t)}$, is further based on a learning rate.

An example of a further embodiment (which may be referred to as example 8), is a method as in example 7, wherein the learning rate, α, is either fixed or dynamically adapted based on one or more performance characteristics.

An example of a further embodiment (which may be referred to as example 9), is a method as in any one of examples 1-8, wherein the first eigenvector is used for performing beamforming at a transmitter and/or receiver without explicit channel state information knowledge.

In an example embodiment, an apparatus is provided (which may be referred to as example 10) including: means for initializing a first recurrent neural network with a first vector; means for iteratively training a weight matrix for one or more layers of the first recurrent neural network, wherein $W^{(t)}$ is the weight matrix of the layer of the first recurrent neural network corresponding to iteration, t, and wherein $W^{(t)}$ is based at least on a channel covariance matrix; the first vector; and an output from a previous layer of the first recurrent neural network corresponding to iteration, t−1; and means for determining a first eigenvector based on a converged output from the first recurrent neural network, wherein the first eigenvector is used to perform beamforming for multiple input multiple output reception and/or transmission.

An example of a further embodiment (which may be referred to as example 11), is an apparatus as in example 10), further comprising means for performing a method as in any one of examples 2-9.

An example of a further embodiment (which may be referred to as example 12), is a computer readable medium including program instructions for causing an apparatus to perform at least the following: initializing a first recurrent neural network with a first vector; iteratively training a weight matrix for one or more layers of the first recurrent neural network, wherein $W^{(t)}$ is the weight matrix of the layer of the first recurrent neural network corresponding to iteration, t, and wherein $W^{(t)}$ is based at least on a channel covariance matrix; the first vector; and an output from a previous layer of the first recurrent neural network corresponding to iteration, t−1; and determining a first eigenvector based on a converged output from the first recurrent neural network, wherein the first eigenvector is used to perform beamforming for multiple input multiple output reception and/or transmission.

An example of a further embodiment (which may be referred to as example 13), is a computer readable medium as in example 12, wherein the program instructions further cause the apparatus to perform a method as in any one of examples 2-9.

In an example embodiment (which may be referred to as example 14), an apparatus is provided comprising: at least one processor; and at least one non-transitory memory including computer program code, the at least one memory and the computer program code configured to, with the at least one processor, cause the apparatus to perform at least: initializing a first recurrent neural network with a first vector; iteratively training a weight matrix for one or more layers of the first recurrent neural network, wherein $W^{(t)}$ is the weight matrix of the layer of the first recurrent neural network corresponding to iteration, t, and wherein $W^{(t)}$ is based at least on a channel covariance matrix; the first vector; and an output from a previous layer of the first recurrent neural network corresponding to iteration, t−1; and determining a first eigenvector based on a converged output from the first recurrent neural network, wherein the first eigenvector is used to perform beamforming for multiple input multiple output reception and/or transmission.

An example of a further embodiment (which may be referred to as example 15), is an apparatus as in example 14, wherein the apparatus is further caused to perform a method as in any one of examples 2-9.

Without in any way limiting the scope, interpretation, or application of the claims appearing below, a technical effect of one or more of the example embodiments disclosed herein is providing a more accurate implementation of eigen-beamforming (such as long-term BF) via RNN training. Another technical effect of one or more of the example embodiments disclosed herein is providing faster convergence and more computationally efficient scheme than the widely applied method of power iteration. Another technical effect of one or more of the example embodiments disclosed herein is that the proposed scheme may be implemented using an existing power iteration architecture. Another technical effect of one or more of the example embodiments disclosed herein is that the proposed scheme has a quadratic, rather than cubic, complexity order, and thus exhibits an appealing performance-complexity trade-off.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method comprising:
    initializing a first recurrent neural network with a first vector;
    iteratively training a weight matrix for one or more layers of the first recurrent neural network, wherein $W^{(t)}$ is the weight matrix of the layer of the first recurrent neural network corresponding to iteration t, and wherein $W^{(t)}$ is based at least on a channel covariance matrix; the first vector; and an output from a previous layer of the first recurrent neural network corresponding to iteration t−1; and
    determining a first eigenvector based on a converged output from the first recurrent neural network, wherein the first eigenvector is used to perform beamforming for multiple input multiple output reception and/or transmission.

2. The method as in claim 1, further comprising:
    using a series of one or more further recurrent neural networks to determine one or more further eigenvectors, wherein:
        the one or more further recurrent neural networks are identical to the first recurrent neural network, and
        each further recurrent neural network is initialized with second vector, where the second vector is based at least on a converged output of the previous recurrent neural network.

3. The method as in claim 2, wherein at least one of:
    a number of the one or more further eigenvectors corresponds to a number of data layers used in the transmission multiple input multiple output reception and/or transmission; or
    the one or more further eigenvectors comprises all remaining eigenvectors.

4. The method as claim 2, wherein at least one of:
    a Gram-Schmidt process is applied to at least the first eigenvector and the one or more further eigenvectors; or
    iteratively training the weight matrix comprises applying a power iteration method.

5. The method as in claim 1, wherein the weight matrix, $W^{(t)}$ comprises a Hermitian matrix.

6. The method as in claim 1, wherein the channel covariance matrix, is based at least on:
    a number of antenna elements of a transmitting entity and a number of antenna elements of each of two or more receiving entities; and
    a number of antenna elements of two or more transmitting entities and a number of antenna elements of a receiving entity.

7. The method as in claim 1, wherein the weight matrix, $W^{(t)}$, is further based on a learning rate.

8. The method as in claim 7, wherein the learning rate, a, is either fixed or dynamically adapted based on one or more performance characteristics.

9. The method as in claim 1, wherein the first eigenvector is used for performing beamforming at a transmitter and/or receiver without explicit channel state information knowledge.

10. An apparatus comprising:
    circuitry configured for initializing a first recurrent neural network with a first vector;
    circuitry configured for iteratively training a weight matrix for one or more layers of the first recurrent neural network, wherein $W^{(t)}$ is the weight matrix of the layer of the first recurrent neural network corresponding to iteration t, and wherein $W^{(t)}$ is based at least on a channel covariance matrix; the first vector; and an output from a previous layer of the first recurrent neural network corresponding to iteration t−1; and
    circuitry configured for determining a first eigenvector based on a converged output from the first recurrent neural network, wherein the first eigenvector is used to perform beamforming for multiple input multiple output reception and/or transmission.

11. The apparatus as in claim 10, further comprising:
    circuitry configured for using a series of one or more further recurrent neural networks to determine one or more further eigenvectors, wherein:
        the one or more further recurrent neural networks are identical to the first recurrent neural network, and
        each further recurrent neural network is initialized with second vector, where the second vector is based at least on a converged output of the previous recurrent neural network in the series.

12. The apparatus as in claim 11, wherein at least one of:
a number of the one or more further eigenvectors corresponds to a number of data layers used in the transmission multiple input multiple output reception and/or transmission; or
the one or more further eigenvectors comprises all remaining eigenvectors.

13. The apparatus as in claim 11, wherein at least one of:
a Gram-Schmidt process is applied to at least the first eigenvector and the one or more further eigenvectors; or
iteratively training the weight matrix comprises applying a power iteration method.

14. The apparatus as in claim 10, wherein the weight matrix, $W^{(t)}$ comprises a Hermitian matrix.

15. The apparatus as in claim 10, wherein the channel covariance matrix, is based at least on:
a number of antenna elements of a transmitting entity and a number of antenna elements of each of two or more receiving entities; and
a number of antenna elements of two or more transmitting entities and a number of antenna elements of a receiving entity.

16. The apparatus as in claim 10, wherein the weight matrix, $W^{(t)}$, is further based on a learning rate.

17. The apparatus as in claim 10, wherein the first eigenvector is used for performing beamforming at a transmitter and/or receiver without explicit channel state information knowledge.

18. The apparatus as in claim 10, wherein either a user equipment or a network node comprises the apparatus.

19. A non-transitory computer readable medium encoded with computer executable instructions for causing an apparatus to perform the method as claimed in claim 1.

20. An apparatus comprising:
at least one processor; and
at least one memory including computer program code, the at least one memory and the computer program code configured to, with the at least one processor, cause the apparatus to:
initialize a first recurrent neural network with a first vector;
iteratively train a weight matrix for one or more layers of the first recurrent neural network, wherein $W^{(t)}$ is the weight matrix of the layer of the first recurrent neural network corresponding to iteration t, and wherein $W^{(t)}$ is based at least on a channel covariance matrix; the first vector; and an output from a previous layer of the first recurrent neural network corresponding to iteration t−1; and
determine a first eigenvector based on a converged output from the first recurrent neural network, wherein the first eigenvector is used to perform beamforming for multiple input multiple output reception and/or transmission.

* * * * *